US010644576B2

(12) United States Patent
Ghoul et al.

(10) Patent No.: US 10,644,576 B2
(45) Date of Patent: May 5, 2020

(54) METHOD FOR MANUFACTURING AN ELECTRICAL MACHINE

(71) Applicant: ABB Schweiz AG, Baden (CH)

(72) Inventors: Cherif Ghoul, Raleigh, NC (US); Darren Tremelling, Apex, NC (US); Sheng Zhong, Hillsborough, NC (US); Parag Upadhyay, Morrisville, NC (US)

(73) Assignee: ABB Schweiz AG, Baden (CH)

( * ) Notice: Subject to any disclaimer, the term of this patent is extended or adjusted under 35 U.S.C. 154(b) by 389 days.

(21) Appl. No.: 15/859,439

(22) Filed: Dec. 30, 2017

(65) Prior Publication Data
US 2019/0207490 A1     Jul. 4, 2019

(51) Int. Cl.
*H02K 15/02* (2006.01)
*H02K 15/10* (2006.01)
*H02K 15/03* (2006.01)
*H02K 1/27* (2006.01)

(52) U.S. Cl.
CPC ........... *H02K 15/03* (2013.01); *H02K 1/2766* (2013.01)

(58) Field of Classification Search
CPC ........ H02K 15/03; H02K 1/28; H02K 1/2766; B22F 7/06; Y10T 29/49009; Y10T 29/49012
USPC .................................................... 29/596, 598
See application file for complete search history.

(56) References Cited

U.S. PATENT DOCUMENTS

| 3,564,705 A | 2/1971 | Cochardt |
| 4,327,302 A * | 4/1982 | Hershberger ......... D06F 37/304 310/156.56 |
| 5,722,154 A | 3/1998 | Dunlap |
| 6,225,724 B1 | 5/2001 | Toide et al. |
| 9,641,033 B2 * | 5/2017 | Papini ..................... H02K 1/28 |

(Continued)

FOREIGN PATENT DOCUMENTS

| EP | 3244517 A1 | 11/2017 |
| GB | 2506932 A | 4/2014 |
| WO | 2017/021078 A1 | 2/2017 |

OTHER PUBLICATIONS

International Search Report and Written Opinion issued in corresponding international application No. PCT/US2018/068110, dated Mar. 26, 2019, 11 pages.

*Primary Examiner* — Donghai D Nguyen
(74) *Attorney, Agent, or Firm* — Taft Stettinius & Hollister LLP; J. Bruce Schelkopf

(57) ABSTRACT

A method for manufacturing for an electrical machine includes: stacking a plurality of rotor laminations to form an axial rotor segment, the rotor segment formed of at least two laminations, each lamination having a plurality of openings therein, the openings forming a plurality of rotor poles in the rotor segment, each pole having a plurality of passages formed from the openings; rotating the rotor segment to place a first pole of the plurality of poles in an alignment position; injecting into the passages of the first pole a polymer bonded permanent magnet (PBM) material in molten form, wherein the (PBM) material includes magnetic particles suspended within a polymeric matrix; subjecting the first pole to a desired magnetic field to align the magnetic particles into a desired orientation prior to solidification of the (PBM) material; and solidifying the (PBM) material to form permanent magnets within the passages of the first pole.

21 Claims, 4 Drawing Sheets

(56) References Cited

U.S. PATENT DOCUMENTS

| | | | |
|---|---|---|---|
| 2003/0062791 A1* | 4/2003 | Reiter, Jr. | ............... B22F 7/06 |
| | | | 310/156.53 |
| 2004/0045635 A1 | 3/2004 | Bandyopadhyay et al. | |
| 2015/0270747 A1 | 9/2015 | Toliyat et al. | |
| 2015/0295459 A1 | 10/2015 | Hao et al. | |
| 2017/0057373 A1 | 3/2017 | Hao et al. | |
| 2017/0063187 A1 | 3/2017 | Hao et al. | |

* cited by examiner

METHOD FOR MANUFACTURING AN ELECTRICAL MACHINE

TECHNICAL FIELD

The present application generally relates to electrical machines and more particularly, but not exclusively, to a method for manufacturing an electrical machine.

BACKGROUND

Electrical machines of various types, e.g., electrical machines that include permanent magnets, such as permanent magnet assisted synchronous reluctance machines, remain an area of interest. Some existing systems have various shortcomings, drawbacks and disadvantages relative to certain applications. For example, in some electrical machines, optimal magnetic alignment of the permanent magnets is not achieved. Accordingly, there remains a need for further contributions in this area of technology.

SUMMARY

One embodiment of the present invention is a unique method for manufacturing an electrical machine. Another embodiment is a unique method for manufacturing a rotor for an electrical machine. Other embodiments include apparatuses, systems, devices, hardware, methods, and combinations for electrical machines. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein:

FIGS. 4A and 4B illustrate some aspects of respective side and top views of a key for aligning laminations in accordance with an embodiment of the present invention.

DETAILED DESCRIPTION OF THE ILLUSTRATIVE EMBODIMENTS

Figure 1:
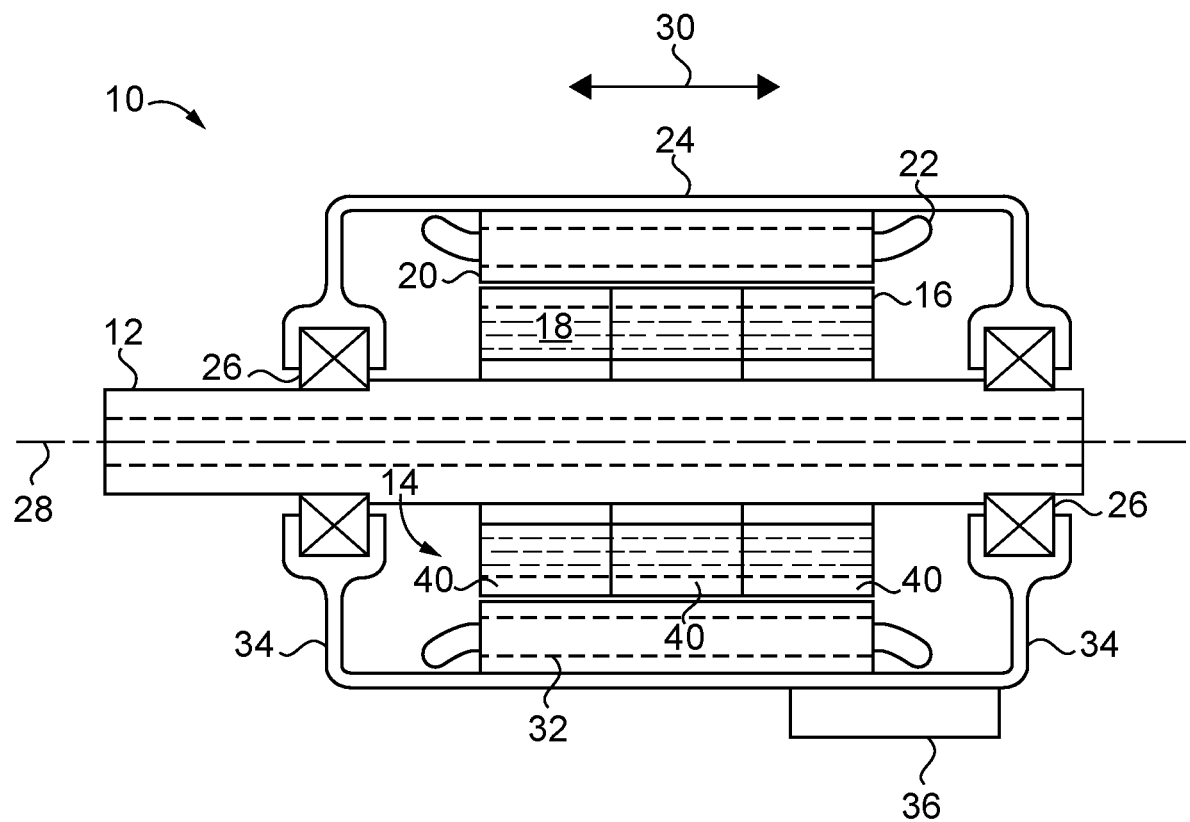
FIG. 1 schematically depicts some aspects of a non-limiting example of an electrical machine in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to the drawings, and in particular FIG. 1, some aspects of a non-limiting example of an electrical machine 10 in accordance with an embodiment of the present invention are schematically depicted. In one form, electrical machine 10 is a 3-phase machine. In other embodiments, electrical machine 10 may be a single-phase machine, or may have any number of phases. In one form, electrical machine 10 is a permanent magnet assisted synchronous reluctance motor. In other embodiments, electrical machine 10 may be a motor and/or a generator, and may be any type of motor, generator or motor/generator that includes permanent magnets. In various embodiments, electrical machine 10 may be a radial flux machine, an axial flux machine or a machine having a three-dimensional (3D) flux path. Electrical machine 10 includes a shaft 12, a rotor 14 having poles 16 that include permanent magnets 18, a stator 20 having stator windings 22, a housing 24 and bearings 26. Shaft 12 and rotor 14 rotate about an axis of rotation 28, which defines an axial direction 30.

Shaft 12 is constructed to support rotor 14 and react radial and axial or thrust loads from rotor 14. In one form, shaft 12 is operative to transmit mechanical power from electrical machine 10 as an output of electrical machine 10. In other embodiments, shaft 12 may be operative to transmit mechanical power to and/or from electrical machine 10. Shaft 12 is axially and radially positioned by bearings 26. Shaft 12 and bearings 26 define axis of rotation 28 and corresponding axial direction 30.

Rotor 14 and stator 20 are in magnetic communication with each other. Each of rotor 14/poles 16 and stator 20 have a construction that is operative to direct magnetic flux toward and from each other. In some embodiments, rotor 14 may include other operative sources of magnetic flux, e.g., bus bars, windings or both, in conjunction with permanent magnets 18.

Stator windings 22 are disposed within passages 32 in stator 20. In one form, stator windings 22 are copper conductors. In other embodiments, aluminum and/or other conductor materials may be employed in addition to or in place of copper. Windings 22 are constructed for magnetic communication with poles 16. In one form, passages 32 are linear, and extend through the length of stator 20 in axial direction 30. In other embodiments, passages 32 may be skewed, may be radial passages or may be passages having a centerline that extends in any two or more of axial, radial and circumferential directions through all or part of stator 20. In some embodiments, stator 20 may include other passages in addition to passages 32, e.g., cooling passages or other passages. In some embodiments, passages 32 may be also constructed to allow a flow of a cooling medium therethrough.

In one form, bearings 26 are mounted in and supported by end plates 34 of housing 24. In some embodiments, one or both end plates 34 may be integral with housing 24. In some embodiments, bearings 26 may be mounted and coupled to housing 24 via one or more other structures and/or integral features of housing 24. Bearings 26 are constructed to react shaft 12 and rotor 14 axial or thrust loads in direction 30, and to react shaft 12 and rotor 14 radial loads perpendicular to axis of rotation 28. Housing 24 is constructed to enclose stator 20 and react loads associated with stator 20, e.g., loads generated due to magnetic interaction between stator 20 and rotor 14. Electrical machine 10 includes a drive 36 operative to control current flow through stator windings 22. In one form, drive 36 is mounted on housing 24. In other embodiments, drive 36 may be disposed at another location.

In one form, permanent magnets 18 are polymer bonded permanent magnets (PBM). In other embodiments, other types of magnets or magnetic material may be employed. In one form, permanent magnets 18 use a polymer/epoxy resin matrix to bond magnetic powders, e.g., magnetic particles in powder form. In other embodiments, other matrix materials may be employed. The magnetic properties of PBMs are determined by the magnetic powder or particles, its content and interaction with the matrix. In some embodiments, thermoplastic polymers may be injection molded to form permanent magnets 18. For example, in one form, PBM is directly injected into cavities in rotor 14, e.g., rotor cavities or passages, to form permanent magnets 18. This process eliminates magnet sintering and subsequent assembly processes, which in some embodiments reduces manufacturing cost and lead time. Also, PBM can be tailored accordingly to user demands. The magnetic powder or particle selection may include Nd—Fe—B (neodymium-iron-boron), Sm—Fe—N (samarium-iron-nitrogen), ferrite powder and their mixtures. In other embodiments, other magnetic powder or particle materials may be employed. In one form, the polymeric matrix may be or include nylon, polypropylene and/or polyphenylene-sulfide. In other embodiments, other polymeric matrix materials may be employed.

In one form, PBM is directly injected into the rotor cavities or passages (passages 48, described below and illustrated in FIG. 2) to form permanent magnets 18. In other embodiments, other techniques may be employed to form permanent magnets 18 inside the rotor cavities or passages. For example, compression molding may be employed, wherein the cavities are filled with the permanent magnet material. The permanent magnet material is subsequently solidified, e.g., by curing, after saturation and/or alignment (described below) to form permanent magnets 18. In one form, rotor 14 is placed into a magnetizer to achieve saturation of the magnets. In one form, the magnetic powder or particles that are used to form permanent magnets 18 are anisotropic. In one form, the magnetic powder or particles are aligned, e.g., in order to achieve a desired magnetic field orientation from permanent magnets 18. Alignment is performed by applying a desired magnetic field in the desired directions when the PBM melt exhibits low viscosity and is susceptible to alignment, e.g., when the PBM material is molten. In one form, each pole 16 is magnetized one at a time. For example, a first pole 16 is injected with PBM and then aligned, followed by a second pole 16 being injected with PBM and then aligned, until all the poles have been injected and aligned. In some embodiments, more than one pole 16 may be injected with PBM at the same time, but only one pole 16 may be aligned at a time. In other embodiments, more than one pole 16 may be injected and/or aligned at the same time, e.g., poles 16 that are spaced apart from each other. In one form, the alignment magnets, i.e., the magnets that generate the desired magnetic field that aligns the magnetic particles or powder, are permanent magnets. In other embodiments, the alignments magnets may also include or may alternatively be electromagnets.

By aligning the poles 16 in the above described manner, e.g., only aligning one (and in some embodiments, more than one select and non-adjacent poles) at the same time, more control over the aligning magnetic field may be obtained. For example, schemes that align all or adjacent poles at the same time may experience undesirable interference between the magnetic field(s) generated by one set of alignment magnets used to align one pole with the magnetic field(s) generated by an adjacent set of alignment magnets used to align an adjacent pole. With embodiments of the present invention, the array of alignment magnets allows for a magnetic field concentration more effective than a Hallbach array. Thus, with embodiments of the present invention, poles 16 may achieve more desirable magnetic field characteristics than if all poles or adjacent poles were aligned at the same time. Also, some embodiments of the present invention, e.g., embodiments injecting only one pole 16 at a time, allow a reduction in PBM material injected at any one time, which enables the use of smaller injection molding machines.

Figure 2:
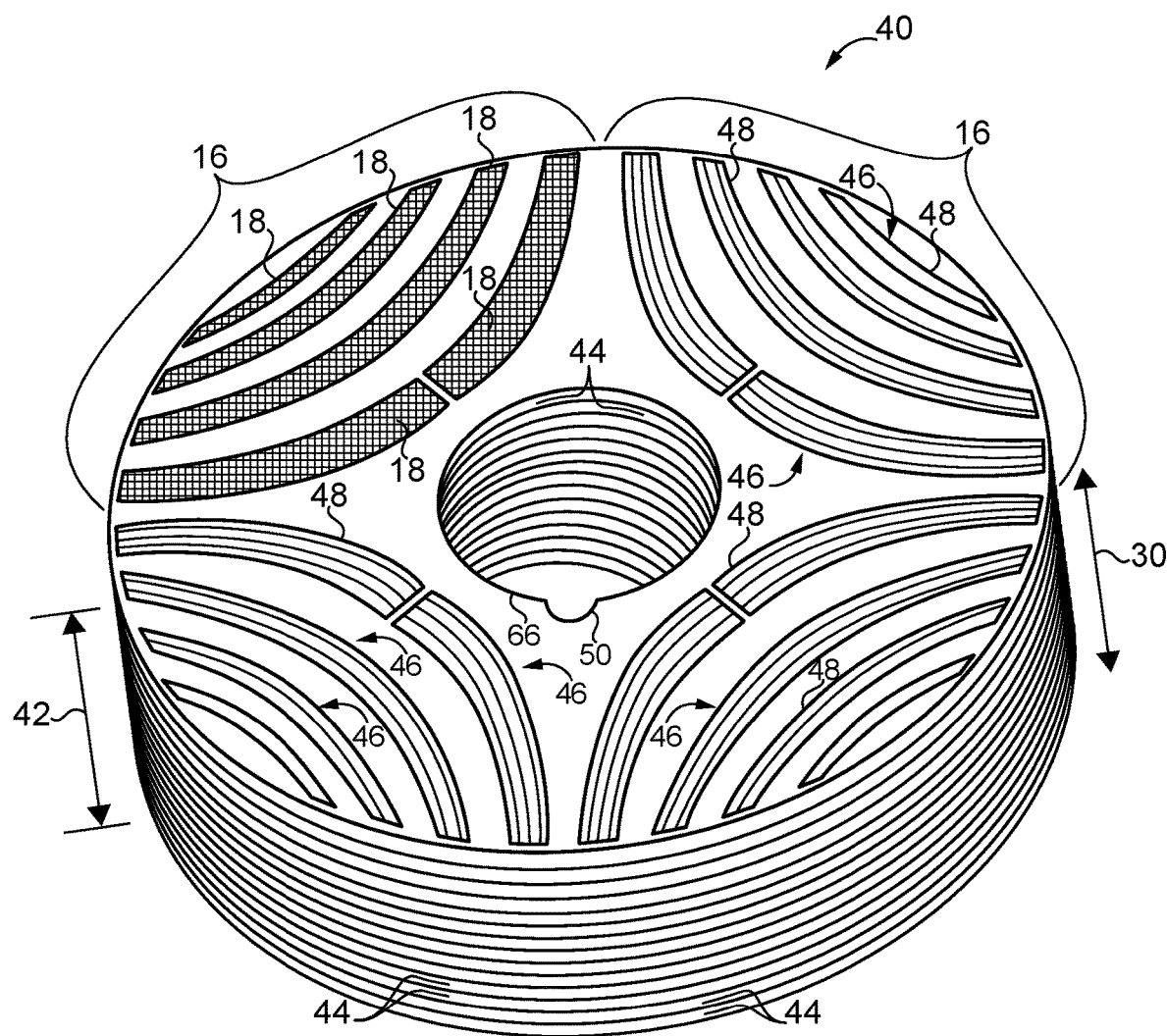
FIG. 2 illustrates some aspects of a non-limiting example of a rotor segment in accordance with an embodiment of the present invention.

Referring to FIG. 2, some aspects of a non-limiting example of an axial rotor segment 40 in accordance with an embodiment of the present invention is illustrated. In one form, rotor 14 is formed of a plurality of rotor segments 40. The example illustrated in FIG. 1 employs three (3) such axial rotor segments. The number of rotor segments 40 in any particular rotor 14 may vary with the needs of the application. In the illustrated example, the number of poles 16 is four (4). The number of poles 16 in any particular rotor 14 may vary with the needs of the application.

Each rotor segment 40 has a length 42 in the axial direction 30. Rotor segment 40 is formed of a plurality of rotor laminations 44. In one form, rotor laminations 44 are stacked together to form each axial rotor segment 40. Each rotor segment 40 is formed of at least two laminations 44. The length 42 may be determined, for example, by the depth of the mold cavity used for injecting permanent magnets 18 (e.g., which determines the maximum number of laminations 44 that can be used to form rotor segment 40), and in some embodiments, based on the height of the alignment magnets used in the mold for aligning the PBM magnetic material (e.g., because it is desirable to keep all of the laminations within a desired portion of the aligning magnetic field generated by the alignment magnets). In some embodiments, metal inserts or spacers may be placed in the mold cavity, e.g., below the rotor segment 40, in order to vary the maximum number of laminations 44 that can fit into the mold, and hence vary the length of rotor segment 40.

Each rotor lamination 44 has a plurality of openings or slots 46 therein, e.g., curvilinear slots, although other slot shapes or configurations may be used in other embodiments. Slots 46 form a plurality of rotor poles 16 in the rotor segment 40, each pole 16 having a plurality of passages 48 formed from the slots 46. Passages 48 extend from one end of rotor segment 40 through to the opposite end. In the depiction of FIG. 2, the passages 48 for one pole 16 have been injection molded with PBM to form permanent magnets 18, whereas the other three (3) poles 16 have not yet been injection molded, in order to clarify the locations of slots 46 and passages 48.

Rotor laminations 44 are indexed with a keyway so that they can be placed in a desired rotational position on a mandrel and stacked to a desired stack length 42 of the rotor segment 40. Each rotor lamination 44 has a keyway 50 for aligning the rotor lamination 44 with other rotor laminations 44. In some embodiments, each rotor lamination 44 in a particular rotor segment 40 is aligned with each other rotor lamination 44 in the same rotor segment 40. In other embodiments, rotor laminations 44 may be skewed, i.e., rotationally skewed, relative to other rotor laminations 44 in the same rotor segment 40. In some embodiments, in a particular rotor 14, all rotor segments 40 may be aligned, whereas in other embodiments, one or more rotor segments 40 may be skewed, i.e., rotationally skewed, relative to one or more other rotor segments 40.

Figure 3:
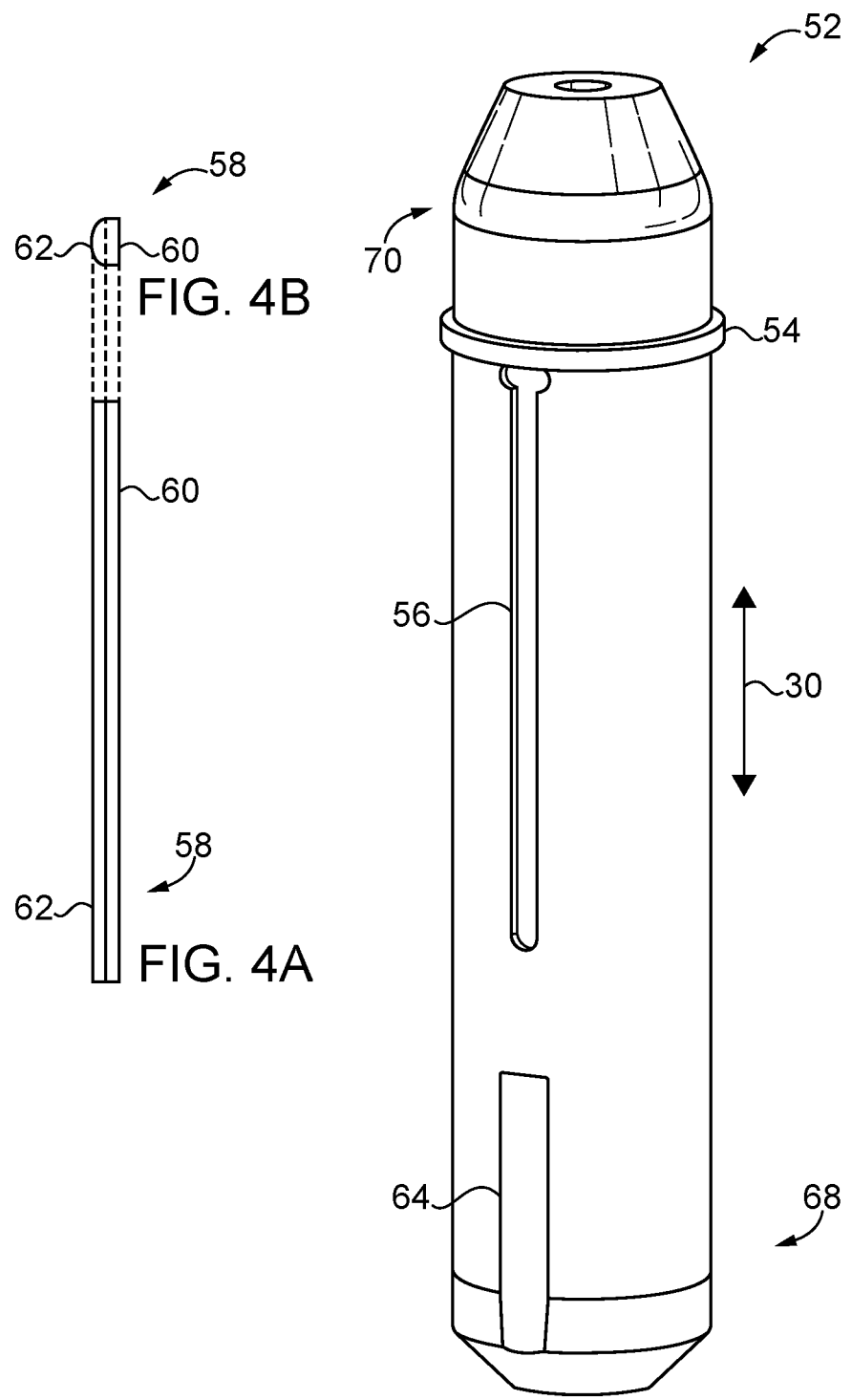
FIG. 3 illustrates some aspects of a non-limiting example of a mandrel for stacking and aligning rotor laminations to generate a rotor segment in accordance with an embodiment of the present invention

Referring to FIG. 3, some aspects of a non-limiting example of a mandrel 52 for stacking rotor laminations 44 to achieve or generate a rotor segment 40 is illustrated in accordance with an embodiment of the present invention. Rotor laminations 44 are stacked onto mandrel 52, and are axially positioned on mandrel 52 by a shoulder 54 that functions as a stop to limit axial movement of the rotor laminations 44. The desired amount of rotor laminations 44 are stacked onto mandrel 52 to generate a rotor segment 40 that extends in the axial direction 28, parallel to mandrel 52. Mandrel 52 includes a keyway 56 for holding a key 58, a side view and a top view of which are illustrated in FIGS. 4A and 4B, respectively.

Mandrel 52 is constructed to align rotor laminations 44 in a desired rotational orientation or skew relative to each other, e.g., using key 58 engaging both keyway 56 of mandrel 52 and keyways 50 of rotor laminations 44. In other embodiments, rotor laminations 44 may include one or more protuberances configured to engage keyway 56 of mandrel 52 in order to align rotor laminations 44. In still other embodiments, mandrel 52 may include one or more protuberances configured to engage keyway 50 in rotor laminations 44 in order to align rotor laminations 44.

In the illustrated embodiment, keyway 56 is straight and parallel to mandrel 52, thus, in conjunction with key 58, aligning rotor laminations 44 in parallel with each other, with no skew between rotor laminations 44. In other embodiments, keyway 56 and key 58 may have a spiral component, providing a skew between each rotor lamination 44 in the rotor segment 40.

In the illustrated embodiment, keyway 56 has a flat bottom, which is constructed to engage a flat bottom 60 on key 58. Key 56 has an oval or elliptical top 62, which is constructed to engage an oval or ellipse keyway 50 of rotor laminations 44. The geometric shapes of keyway 50, keyway 56 and key 58 may vary with the needs of the application.

Mandrel 52 includes rotational positioning feature 64 at a bottom portion 68 of mandrel 52. In the illustrated embodiment, rotational positioning feature 64 is a flat. In other embodiments, it may be a key or keyway or any geometric feature that may be used to provide rotational positioning for mandrel 52. Rotational position feature 64 is used to rotationally align poles 16 with the alignment magnets and desired magnetic field for aligning the magnetic particles in the PBM.

During assembly of a rotor segment 40, and rotor laminations 44 are stacked onto mandrel 52 using an opening 66 (FIG. 2) in the center of rotor laminations 44, which receive therein mandrel 52. Rotor laminations 44 are installed onto a bottom portion 68 of mandrel 52 opposite a top portion 70 of mandrel 52. Key 58 and keyways 50 and 56 align rotor laminations 44. The first rotor lamination 44 abuts shoulder 54 of mandrel 52, and subsequently installed rotor laminations 44 abut previously installed rotor laminations 44. The length 42 (FIG. 2) of the stack of rotor laminations 44, i.e., of rotor segment 40, may vary with the needs of the application. The number of rotor segments 40 used to form a rotor 14 may vary with the needs of the application. Rotor 14 may be formed of rotor segments 40 having the same or different lengths 42.

Figure 5:
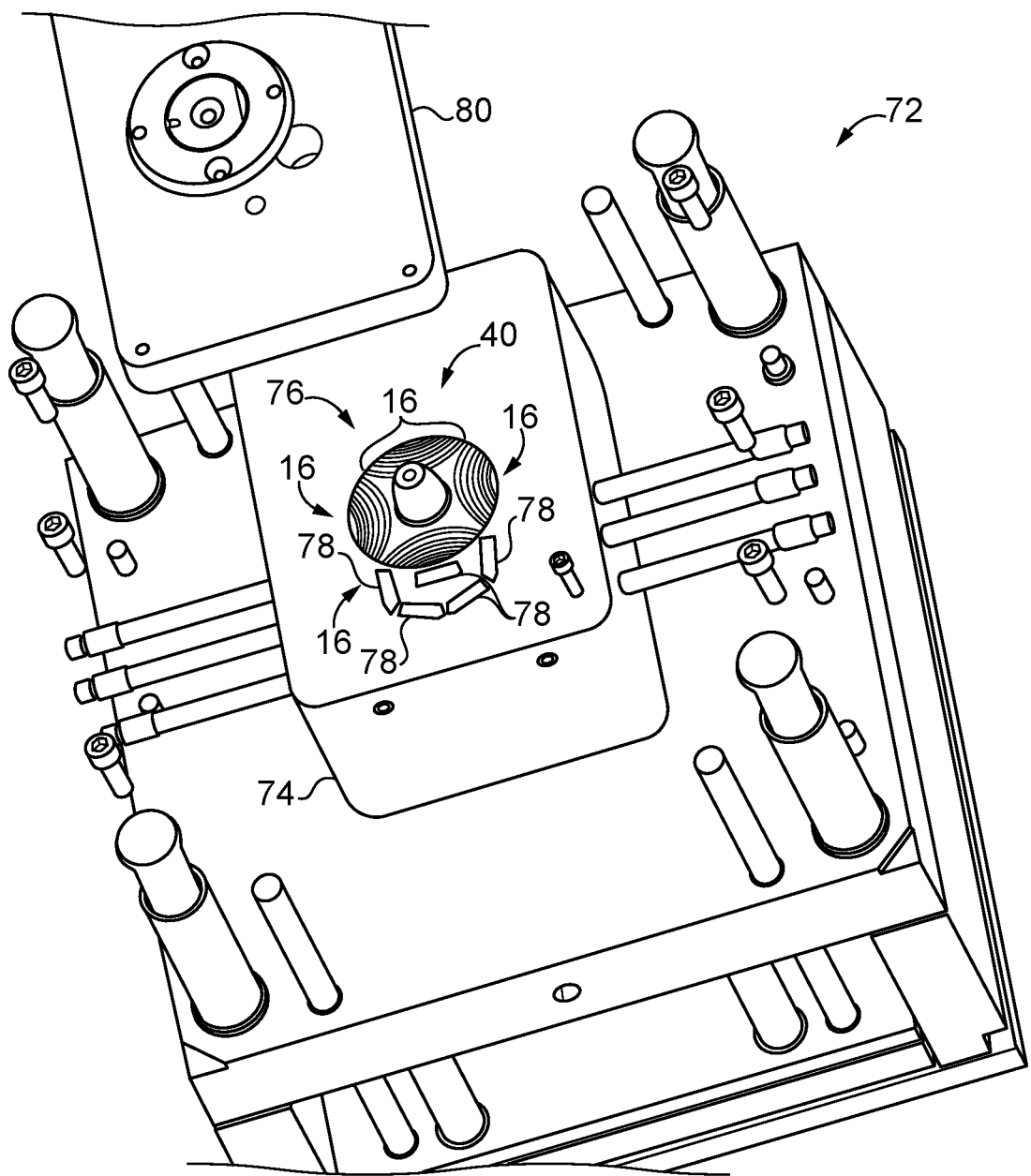
FIG. 5 illustrates some aspects of a non-limiting example of a mold for injection molding PBM (polymer bonded permanent magnet) material into rotor segments and for aligning the magnetic particles or powder in the PBM prior to the solidification of the PBM that yields the permanent magnets.

Referring to FIG. 5, some aspects of a non-limiting example of a mold system 72 for injection molding PBM material into passages 48 of rotor segments 44 and for aligning the PBM material prior to the solidification of the PBM material that yields permanent magnets 18. The rotor segment 40 is inserted into a bottom mold portion 74, and rotated so that one of the poles 16 is placed into an alignment position 76 with respect to alignment magnets 78. The alignment position may be achieved by rotational positioning feature 64 of bottom portion 68 of mandrel 52 engaging a mating rotational feature (not shown) in bottom mold portion 74. A top mold portion 80 is then secured in place over bottom mold portion 74, and PBM is injection molded into the passages 48 of the pole 16 that is in the alignment position. In some embodiments, the PBM may be injection molded into the passages prior to placing the pole 16 into the alignment position 76.

The PBM, e.g., polymer bonded permanent magnet material formed of a polymer matrix with magnetic particles suspended therein, is injected into the passages 48 formed by the slots or openings 46 for the pole 16 that is in the alignment position 76 with the alignment magnets 78. While the PBM is molten and in the alignment position 76, the pole 16 is subjected to a desired magnetic field generated by the alignment magnets 78 to align the magnetic particles into a desired orientation prior to solidification of the polymer bonded permanent magnet material. The PBM is then solidified, e.g., by cooling, to form permanent magnets 18 within passages 48 of the pole in alignment position 76. The pole 16 being aligned is maintained or retained in the alignment position until the PBM sufficiently solidifies such that the alignment of the magnetic particles is retained. The process is then repeated for each remaining pole 16 of rotor 14. The process may be repeated a plurality of times to generate a plurality of rotor segments 40 that may be combined to build a rotor 14 of desired length.

With embodiments of the present invention, each pole is individually injected and aligned, e.g., one pole is injected and aligned prior to injecting and aligning other poles in some embodiments. This allows for a smaller mold and a smaller injection press. In addition, it reduces the magnetic forces inside the mold and allows for easy handling. Also, in some embodiments, a runnerless system is used. In some embodiments, the gate is located directly above or directly on top of the passages 48 of one pole, e.g., the pole being injected, reducing the amount of PBM material used, and reducing the loss of melt temperature. Reducing the loss of melt temperature allows for easy filling of the mold and more time to align the magnets when the PBM melt is at low viscosity. The other poles are isolated from the melt material by two walls preventing any PBM from flowing into the passages 48 of other poles, e.g., of adjacent poles. The A side of the mold is designed to accommodate the excess of PBM from the space between the gate and the mold cavity. The wall of the mold cavity parallel to the A side can be designed as a negative of the shape of excess PBM on the A side to allow easy assembly of stacks.

Embodiments of the present invention include a method for manufacturing an electrical machine, comprising: (a) stacking a plurality of rotor laminations to form an axial rotor segment, the rotor segment formed of at least two laminations, each rotor lamination having a plurality of curvilinear slots therein, the curvilinear slots forming a plurality of rotor poles in the rotor segment, each pole having a plurality of curvilinear passages formed from the curvilinear slots; (b) rotating the rotor segment to place a first pole of the plurality of poles in an alignment position; (c) injecting into the curvilinear passages of the first pole a polymer bonded permanent magnet material in molten form, wherein the polymer bonded permanent magnet material includes magnetic particles suspended within a polymeric matrix; (d) subjecting the first pole to a desired magnetic field to align the magnetic particles into a desired orientation prior to solidification of the polymer bonded permanent magnet material; solidifying the polymer bonded permanent magnet material to form permanent magnets within the curvilinear passages of the first pole; and (f) after performing (e) for the first pole, performing (b), (c), (d), (e) for each remaining pole of the plurality of poles.

In a refinement, the method further comprises repeating (a) through (f) to form at least two rotor segments; and combining the at least two rotor segments to form a rotor for the electrical machine.

In another refinement, a first rotor segment is rotationally skewed relative to a second rotor segment.

In another refinement, at least one lamination is rotationally skewed relative to another lamination.

In yet another refinement, the desired magnetic field is generated by at least one permanent magnet.

In still another refinement, the polymeric matrix is or includes at least one of nylon, polypropylene and polyphenylene-sulfide.

In yet still another refinement, the magnetic particles are or include at least one of NdFeB, Sm—Fe—N, and ferrite powder.

In a further refinement, the electrical machine is a permanent magnet assisted synchronous reluctance motor and/or generator.

In a yet further refinement, the magnetic particles are anisotropic magnetic particles.

In a still further refinement, (c) is performed prior to performing (d).

In a yet still further refinement, the method further comprises maintaining the first pole in the alignment position while subject to the desired magnetic field until the polymer bonded permanent magnet material solidifies Embodiments of the present invention include a method for manufacturing a rotor for an electrical machine, comprising: stacking a number of rotor laminations on a mandrel to achieve a rotor segment extending in an axial direction parallel to the mandrel, wherein the mandrel is constructed to align the rotor laminations in a desired rotational orientation relative to each other, wherein the laminations have a plurality of openings therein, wherein the stacked rotor laminations form a rotor segment; wherein the plurality of openings form a plurality of passages extending through the rotor segment; and wherein the rotor segment has a plurality of poles; selecting a pole for forming therein a permanent magnet; injecting the pole with a polymer bonded permanent magnet material in molten form, wherein the polymer bonded permanent magnet material includes magnetic particles suspended within a polymeric matrix; aligning the magnetic particles within the polymer matrix into a desired orientation using a desired magnetic field; solidifying the polymer bonded permanent magnet material to form a solid permanent magnet; and after the solidifying, repeating the selecting, injecting, aligning and solidifying for each pole of the plurality of poles.

In a refinement, a first rotor segment is rotationally skewed relative to a second rotor segment.

In another refinement, at least one lamination is rotationally skewed relative to another lamination.

In yet another refinement, the desired magnetic field is generated by at least one permanent magnet.

In still another refinement, the polymeric matrix is or includes at least one of nylon, polypropylene and polyphenylene-sulfide; the magnetic particles are anisotropic; and the magnetic particles are or include at least one of NdFeB, Sm—Fe—N, and ferrite powder.

In yet still another refinement, a key is disposed on the mandrel; wherein each of the rotor laminations includes an alignment slot constructed to engage the key, further comprising engaging the alignment slot of each rotor lamination with the key.

In a further refinement, the mandrel has a slot constructed to hold the key, and the slot and the key are constructed to control a skew between each of the rotor laminations, the method further comprising further comprising controlling a skew between each of the rotor laminations using the slot and the key.

In a yet further refinement, the electrical machine is a permanent magnet assisted synchronous reluctance motor and/or generator.

In a still further refinement, the method further comprises forming at least two rotor segments; and combining the at least two rotor segments to form the rotor for the electrical machine.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method for manufacturing an electrical machine, comprising:
    (a) stacking a plurality of rotor laminations to form an axial rotor segment, the rotor segment formed of at least two laminations, each rotor lamination having a plurality of curvilinear slots therein, the curvilinear slots forming a plurality of rotor poles in the rotor segment, each pole having a plurality of curvilinear passages formed from the curvilinear slots;
    (b) rotating the rotor segment to place a first pole of the plurality of poles in an alignment position;
    (c) injecting into the curvilinear passages of the first pole a polymer bonded permanent magnet material in molten form, wherein the polymer bonded permanent magnet material includes magnetic particles suspended within a polymeric matrix;

(d) subjecting the first pole to a desired magnetic field to align the magnetic particles into a desired orientation prior to solidification of the polymer bonded permanent magnet material;

(e) solidifying the polymer bonded permanent magnet material to form permanent magnets within the curvilinear passages of the first pole; and (f) after performing (e) for the first pole, performing (b), (c), (d), (e) for each remaining pole of the plurality of poles.

2. The method of claim 1, further comprising:

repeating (a) through (f) to form at least two rotor segments; and combining the at least two rotor segments to form a rotor for the electrical machine.

3. The method of claim 2, wherein a first rotor segment is rotationally skewed relative to a second rotor segment.

4. The method of claim 1, wherein at least one lamination is rotationally skewed relative to another lamination.

5. The method of claim 1, wherein the desired magnetic field is generated by at least one permanent magnet.

6. The method of claim 1, wherein the polymeric matrix is or includes at least one of nylon, polypropylene and polyphenylene-sulfide.

7. The method of claim 1, wherein the magnetic particles are or include at least one of NdFeB, Sm—Fe—N, and ferrite powder.

8. The method of claim 1, wherein the electrical machine is a permanent magnet assisted synchronous reluctance motor and/or generator.

9. The method of claim 1, wherein the magnetic particles are anisotropic magnetic particles.

10. The method of claim 1, wherein (c) is performed prior to performing (d).

11. The method of claim 1, further comprising maintaining the first pole in the alignment position while subject to the desired magnetic field until the polymer bonded permanent magnet material solidifies.

12. A method for manufacturing a rotor for an electrical machine, comprising:

stacking a number of rotor laminations on a mandrel to achieve a rotor segment extending in an axial direction parallel to the mandrel, wherein the mandrel is constructed to align the rotor laminations in a desired rotational orientation relative to each other, wherein the laminations have a plurality of openings therein, wherein the stacked rotor laminations form a rotor segment; wherein the plurality of openings form a plurality of passages extending through the rotor segment; and wherein the rotor segment has a plurality of poles;

selecting a pole for forming therein a permanent magnet;

injecting the pole with a polymer bonded permanent magnet material in molten form, wherein the polymer bonded permanent magnet material includes magnetic particles suspended within a polymeric matrix;

aligning the magnetic particles within the polymer matrix into a desired orientation using a desired magnetic field;

solidifying the polymer bonded permanent magnet material to form a solid permanent magnet; and after the solidifying, repeating the selecting, injecting, aligning and solidifying for each pole of the plurality of poles.

13. The method of claim 12, wherein a first rotor segment is rotationally skewed relative to a second rotor segment.

14. The method of claim 12, wherein at least one lamination is rotationally skewed relative to another lamination.

15. The method of claim 12, wherein the desired magnetic field is generated by at least one permanent magnet.

16. The method of claim 12, wherein the polymeric matrix is or includes at least one of nylon, polypropylene and polyphenylene-sulfide; wherein the magnetic particles are anisotropic; and wherein the magnetic particles are or include at least one of NdFeB, Sm—Fe—N, and ferrite powder.

17. The method of claim 12, wherein a key is disposed on the mandrel; wherein each of the rotor laminations includes an alignment slot constructed to engage the key, further comprising engaging the alignment slot of each rotor lamination with the key.

18. The method of claim 17, wherein the mandrel has a slot constructed to hold the key, and wherein the slot and the key are constructed to control a skew between each of the rotor laminations, further comprising controlling a skew between each of the rotor laminations using the slot and the key.

19. The method of claim 12, wherein the electrical machine is a permanent magnet assisted synchronous reluctance motor and/or generator.

20. The method of claim 12, further comprising:

forming at least two rotor segments; and combining the at least two rotor segments to form the rotor for the electrical machine.

21. A method for manufacturing an electrical machine, comprising:

(a) stacking a plurality of rotor laminations to form an axial rotor segment, the rotor segment formed of at least two laminations, each rotor lamination having a plurality of curvilinear slots therein, the curvilinear slots forming a plurality of rotor poles in the rotor segment, each pole having a plurality of curvilinear passages formed from the curvilinear slots;

(b) rotating the rotor segment to place a first pole of the plurality of poles in an alignment position;

(c) filling the curvilinear passages of the first pole with a polymer bonded permanent magnet material, wherein the polymer bonded permanent magnet material includes magnetic particles suspended within a polymeric matrix;

(d) subjecting the first pole to a desired magnetic field to align the magnetic particles into a desired orientation prior to solidification of the polymer bonded permanent magnet material;

(e) solidifying the polymer bonded permanent magnet material to form permanent magnets within the curvilinear passages of the first pole; and (f) after performing (e) for the first pole, performing (b), (c), (d), (e) for each remaining pole of the plurality of poles.

* * * * *